Figure 1:
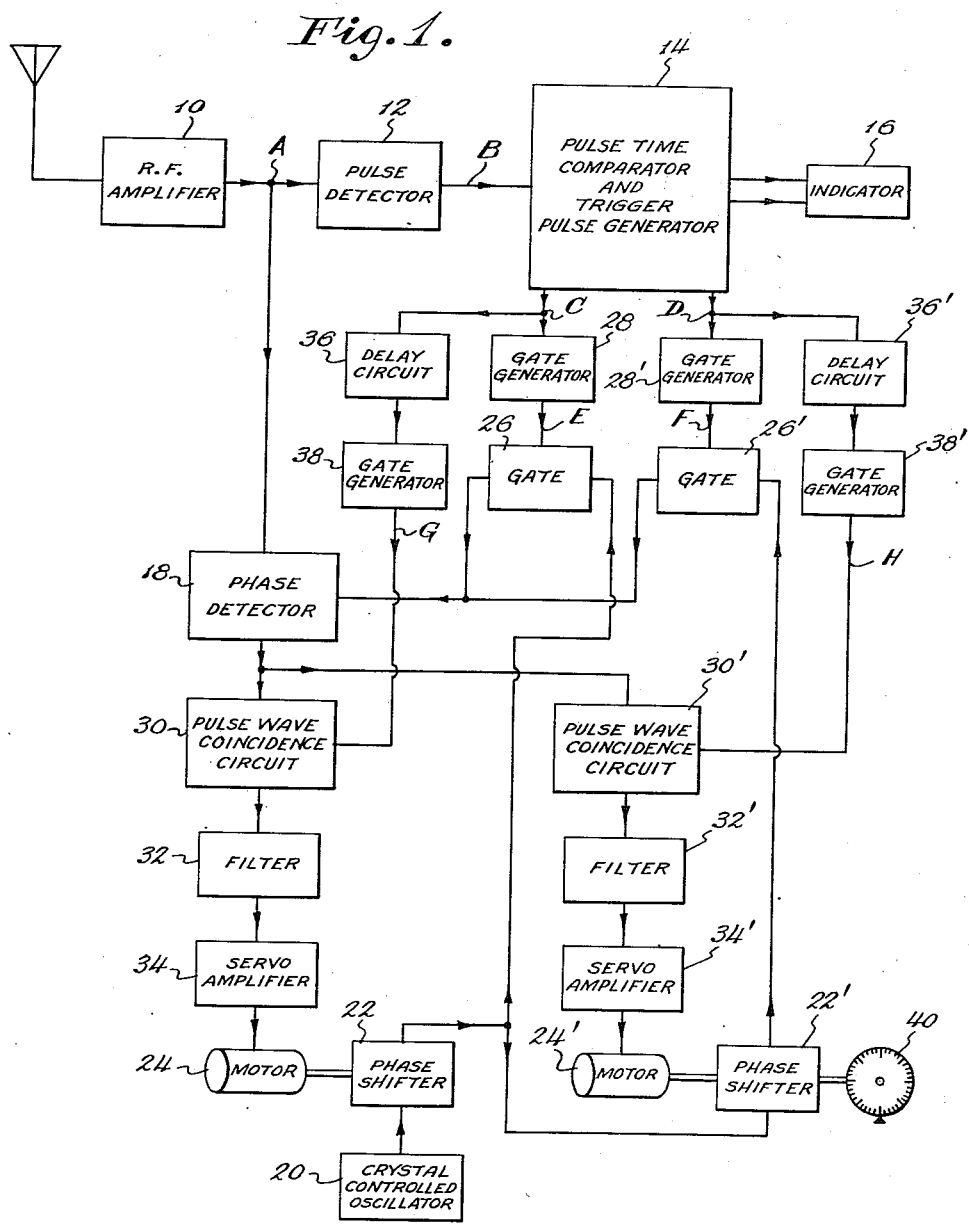

Oct. 9, 1956

R. L. FRANK 2,766,450

APPARATUS FOR MEASURING THE TIME RELATIONSHIP
BETWEEN RECURRENT RADIO FREQUENCY PULSES

Filed June 14, 1951

4 Sheets-Sheet 1

INVENTOR
ROBERT L. FRANK
BY
Paul B. Hunter
ATTORNEY

United States Patent Office 2,766,450
Patented Oct. 9, 1956

2,766,450

APPARATUS FOR MEASURING THE TIME RELATIONSHIP BETWEEN RECURRENT RADIO FREQUENCY PULSES

Robert L. Frank, New York, N. Y., assignor to Sperry Rand Corporation, a corporation of Delaware Application June 14, 1951, Serial No. 231,626

15 Claims. (Cl. 343—103)

This invention relates to apparatus for measuring the time relationship between recurrent radio frequency pulses and particularly to apparatus for measuring the time-phase relationship between the radio frequency components of recurrent radio frequency pulse signals.

It has been found that the accuracy of loran type navigation systems can be increased by controlling not only the time relationships between the pulses transmitted by the master and slave stations, but also the phase relationships between the radio frequency cycles of the pulses transmitted by the stations. At the receiving station the time-delay between corresponding master and slave pulses is measured with great accuracy, and this measurement is supplemented by phase comparisons between the radio frequency components of the master and slave pulses to provide even greater accuracy.

Copending applications S. N. 117,917, filed on September 15, 1949, by Walter N. Dean, and S. N. 131,684, filed on December 7, 1949, by Philip W. Crist, disclose receiving apparatus for measuring the time-delay between master and slave pulses with great accuracy.

Copending applications S. N. 34,283, filed June 3, 1948, now Patent No. 2,728,909, issued December 27, 1955, and S. N. 92,797, filed May 12, 1949, by Winslow Palmer, disclose receiving apparatus for measuring the time-phase relationships between the radio frequency components of the master and slave pulses. The latter application discloses receiving apparatus in which automatic phase measurement is achieved by producing reference radio frequency signals which have a fixed phase relation to the radio frequency components of the master and slave signals received thereby, and then the phase relationship between the reference signals is measured in order to determine the phase relationship between the master and slave signals. Servo systems are employed to synchronize the reference signals with the radio frequency components of the received pulse signals, and separate phase detectors are employed in each servo system to produce the control signals for the servo-controlled apparatus for producing the reference signals.

It has been found that the accuracy of such a system is impaired somewhat due to the fact that the various phase detectors do not have identical characteristics.

This difficulty is overcome in the present invention by employing a single phase detector to produce the control signals for the servo-controlled apparatus for producing the reference signals.

In accordance with the present invention, phase measurements between the radio frequency components of the master and slave signals of a loran type navigation system is accomplished by applying the radio frequency pulse signals received from the loran transmitting system to one of the input circuits of a single phase detector, and a time-sharing arrangement synchronized with the received loran pulses is employed to connect reference signals to the other input circuit of the phase detector so that the proper reference signal is connected to the phase detector during the time when each of the loran pulses is received.

The output of the phase detector may be employed to actuate servo-controlled apparatus for adjusting the phase of the reference signals, or it may be observed directly on an oscilloscope. In the latter embodiment, the phase of the reference signals is adjusted manually.

Accordingly, it is an object of this invention to provide improved apparatus for measuring the phase relationship between the radio frequency components of radio frequency pulse signals.

Another object of the invention is to provide improved receiving apparatus for measuring the time relationship between recurrent radio frequency pulses with great accuracy.

Figure 2:
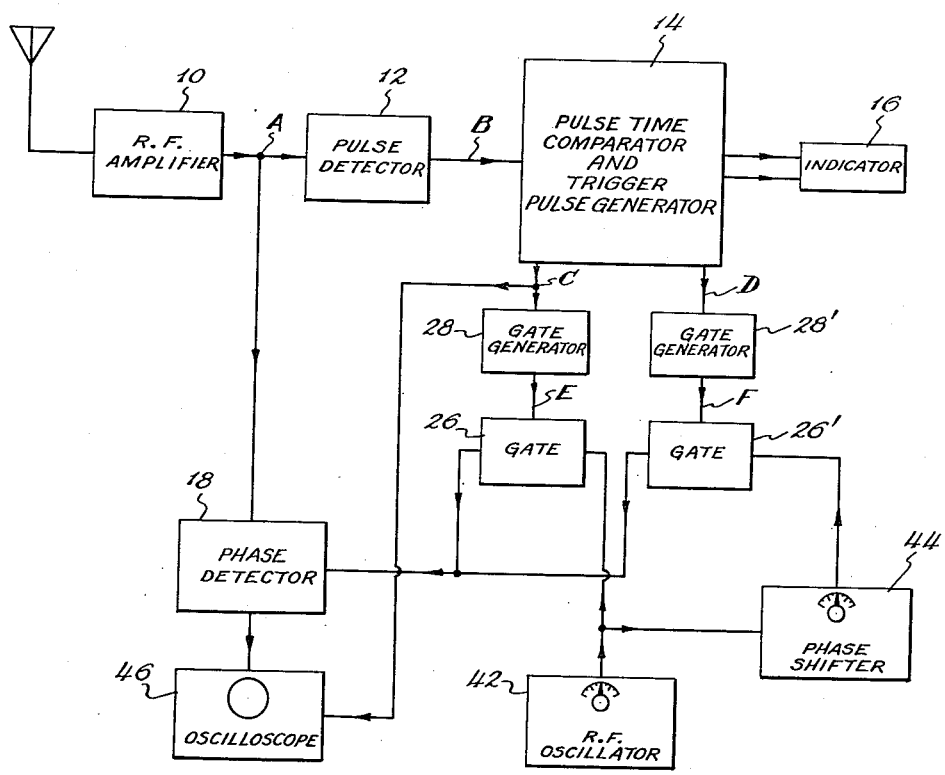
Figure 3:
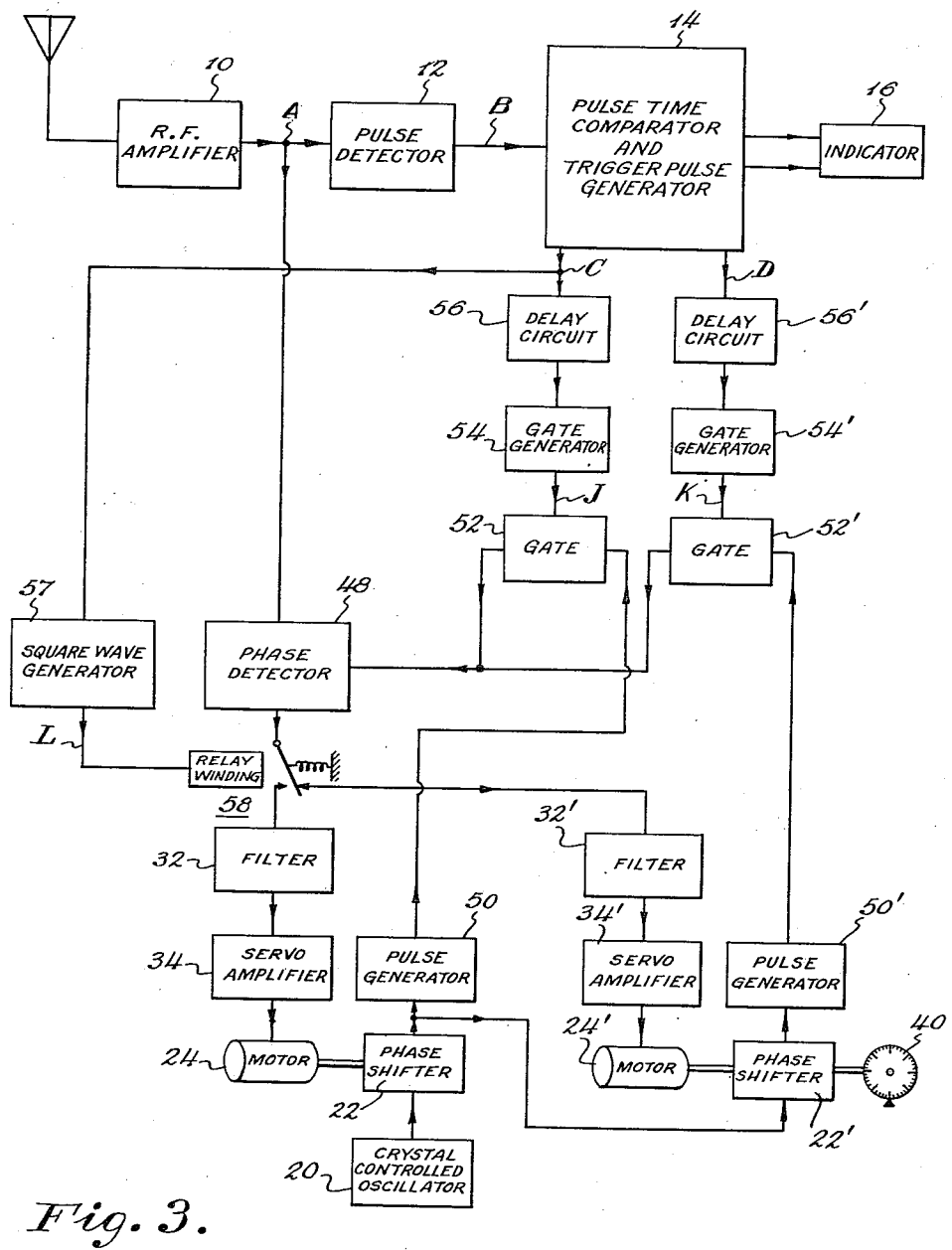
Figure 4:
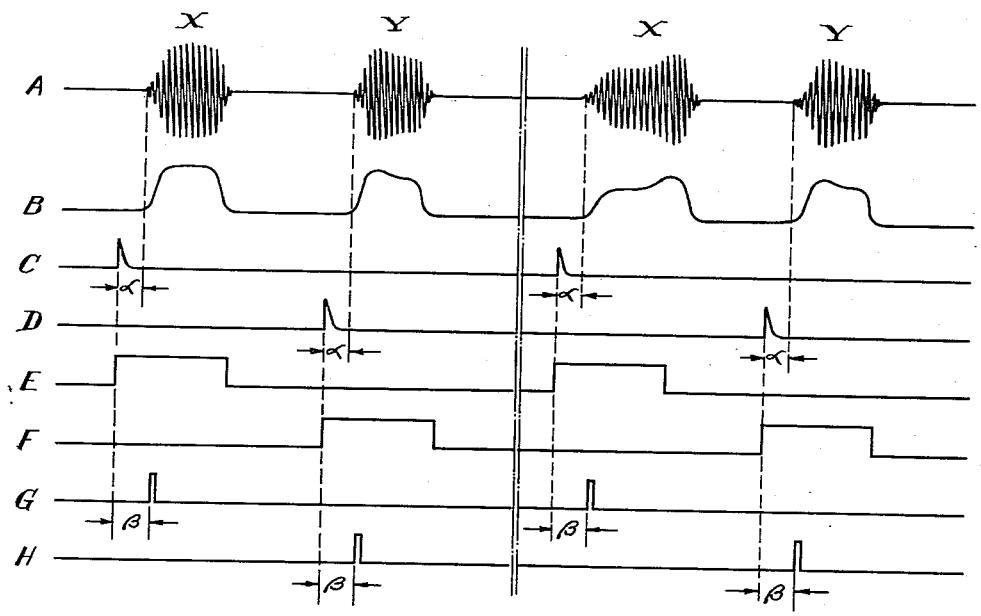
Figure 5:
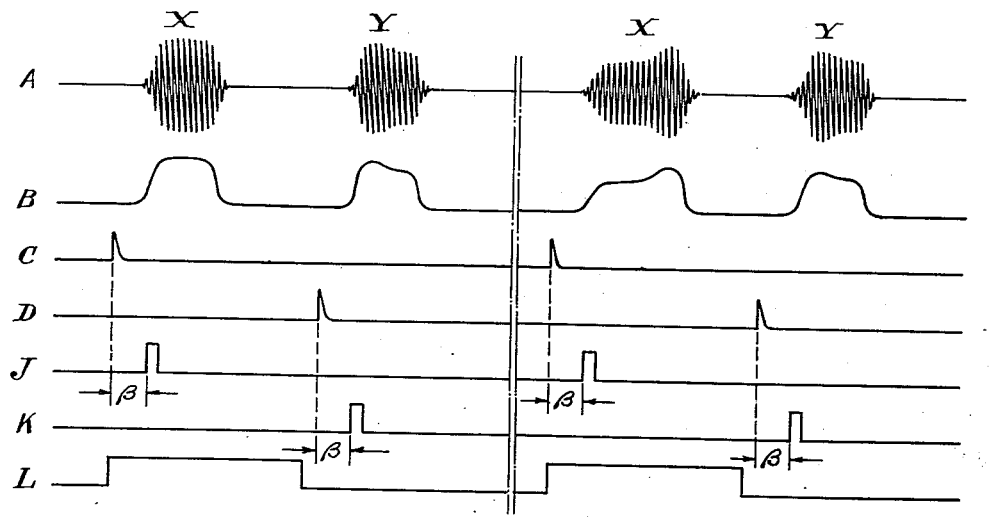

Further objects and advantages of the invention will be apparent from the following description, the appended claims, and the drawings, in which, Fig. 1 shows a preferred embodiment of the invention in block diagrammatic form;

Figs. 2 and 3 show alternative embodiments of the apparatus shown in Fig. 1; and Figs. 4 and 5 show the wave form of and time relationships among the various signals produced by the apparatus shown in Figs. 1 and 3 respectively.

In the discussion of the various embodiments of this invention which follows, frequent reference will be made to the wave form of and time relationships among the various signals which are produced by the apparatus. It is to be observed that the letter which identifies each of the signals A to L shown in Figs. 4 and 5 is also employed to identify the circuit which conveys the corresponding signal in the figures showing the various embodiments of the invention.

For convenience, this disclosure is limited to a loran receiving system for receiving the master and slave radio frequency signals produced by one pair of loran transmitters. It will be apparent that the system may be enlarged to receive the master and slave signals produced by two pairs of loran transmitters, or to receive the master and slave signals produced by a low frequency triad loran transmitting system.

In the discussion which follows, it is assumed that the phase of the radio frequency cycles produced by the master and slave transmitting stations is synchronized so as to permit accurate distance measurements based thereon.

Referring now to Figs. 1 and 4, the apparatus shown in Fig. 1 serves to receive and provide an accurate indication of the time-delay between the master and slave signals which are produced by the loran transmitters (not shown). The signals shown at A of Fig. 4 are illustrative of the wave forms of the master pulses X and the slave pulses Y received under two normal operating conditions. The first master pulse X is substantially undistorted, and the second master pulse X and the two slave pulses Y are affected by sky-wave interference which distorts the trailing edges of these pulses.

A radio frequency amplifier 10 serves to amplify the master and slave signals which are received by the apparatus shown in Fig. 1, and the amplified signals A which are produced thereby are applied to a pulse detector 12 which serves to produce the signals B representing the amplitudes and wave forms of the master and slave signals X and Y.

The signals B are applied to a pulse time comparator and trigger pulse generator 14 which serves to produce pulses C and D which occur a fixed time $\alpha$ before the respective pulses B which correspond to the master and slave signals X and Y.

The pulse time comparator and trigger pulse generator 14 also serves to produce pulses which are coincident with the leading edges of the master and slave pulses, and these pulses are applied to an indicator 16 which serves to provide an indication of the time-delay between the master and slave pulses. Thus, the indicator 16 serves to provide a fairly precise indication of the time-delay between the master pulses X and the slave pulses Y, and the time-delay which is determined in this manner may be employed to locate a hyperbolic curve upon which the receiving apparatus is located.

Various pulse time comparators and trigger pulse generators are known in the art and will not be discussed herein. A suitable pulse time comparator and trigger pulse generator 14 and indicator 16 are disclosed and discussed in detail in the aforesaid copending application S. N. 117,917. Also, the corresponding elements in a conventional loran receiver may be substituted for the elements 12—16, if desired.

The remainder of the apparatus shown in Fig. 1 serves to provide an indication of the phase relationship between the radio frequency components of the master and slave pulses A, thereby providing a very precise indication of the time-delay between the master and slave pulses which may be employed to precisely locate the hyberbolic curve upon which the receiving apparatus is located.

The phase relationship between the radio frequency cycles of the master and slave pulses is determined by providing a first reference radio frequency signal which has a predetermined phase relationship with respect to the master pulses X and by providing a second reference radio frequency signal which has the same predetermined phase relationship with respect to the slave pulses Y. The second reference signal is a phase-shifted version of the first reference signal, and the phase relationship between the two reference signals is measured by determining the amount of phase shift introduced to produce the second reference signal.

A pair of similar servo loops are employed to control the frequency of and phase relationships between the two reference signals, and the control signals for the two servo systems are derived from a single phase detector 18. The phase detector 18 may be the type disclosed in Patent No. 2,256,487 granted to F. L. Moseley et al. on September 23, 1941, which serves to produce an output signal which is proportional to the cosine of the phase angle between two input signals.

A radio frequency oscillator 20 serves to provide the first reference signal which is maintained in a predetermined phase relationship with respect to the radio frequency cycles of the master pulses X by means of a phase-shifter 22, which in turn is controlled by a servomotor 24.

The output of the phase shifter 22 is applied to a switching circuit or gate 26 which is actuated by means of the pulses E which are produced by a gate generator 28 in response to the pulses C produced by the pulse time comparator and trigger pulse generator 14.

The output of the gate 26 is applied to one of the input circuits of the phase detector 18. Thus, the first reference signal, which is produced at the output of the phase shifter 22, is applied to the phase detector 18 during the times when each of the master pulses X occur.

The radio frequency pulse signals A are applied to the other input circuit of the phase detector 18, so that during each of the master pulses X, the phase detector 18 produces output signals which vary in accordance with the phase relationship between the master pulses X and the first reference signal which is produced by the phase shifter 22.

The output of the phase detector 18 is applied to a pulse wave coincidence circuit 30 which serves as a switching circuit to connect the output of the phase detector 18 to a filter 32 which has a long time constant with respect to the duty cycle of the pulse wave coincidence circuit 30.

The pulse wave coincidence circuit 30 may be the four diode type shown on page 12 of the Proceedings of the Institute of Radio Engineers for January, 1943, for example.

The output of the filter 32 is applied to a servo amplifier 34, and the output of the servo amplifier 34 is applied to the motor 24 which controls the position of the phase shifter 22.

The pulse wave coincidence circuit 30 is actuated for brief intervals of time during the leading edges of each of the master pulses X by means of pulses G which are produced at a time $\beta$ after each of the pulses C by means of a delay circuit 36, to which the pulses C are applied, and a gate generator 36 which is responsive to the output of the delay circuit 36.

The pulse wave coincidence circuit 30 should be actuated only during a brief interval of time during the leading edges of each of the loran pulses so that the control signals for the servo system are not affected by sky-wave interference which often distorts the trailing edges of the loran pulses.

Thus, the phase detector 18 serves to produce output signals which vary in accordance with the phase relationship between the master pulses X and the reference signal produced at the output of the phase shifter 22, and the output of the phase detector 18 is connected through the pulse wave coincidence circuit 30 to the filter 32 for a brief interval of time during the leading edges of each of the master pulses X. The signals produced at the output of the filter 32 serve to control the servo system so that the radio frequency reference signal produced by the phase shifter 22 is maintained in fixed phase relationship with respect to the radio frequency cycles of the master pulses X.

The second reference signal is produced by applying the output of the phase shifter 22 to another servo-controlled phase shifter 22'.

The phase relationship between the first and second reference signals, which is the same as the phase relationship between the master pulses X and the slave pulses Y, is measured by means of an indicator 40 which serves to indicates the amount of phase shift introduced by the phase shifter 22'.

The output of the phase shifter 22' is applied to a switching circuit or gate 26' which is actuated by means of the pulses F which are produced by a gate generator 28' in response to the pulses D produced by the pulse time comparator and trigger pulse generator 14.

The output of the gate 26' is applied to one of the input circuits of the phase detector 18. Thus, the second reference signal, which is produced at the output of the phase shifter 22', is applied to the phase detector 18 during the times when each of the slave pulses Y occur, and the phase detector 18 produces output signals which vary in accordance with the phase relationship between the slave pulses Y and the reference signal which is produced by the phase shifter 22'.

Since the pulse wave coincidence circuit 30 is not activated during the times when the slave pulses Y occur, the servo system which controls the first reference signal is not affected by the output signal which is produced by the phase detector 18 during each of the slave pulses Y.

However, the output of the phase detector 18 is also applied to another pulse wave coincidence circuit 30' which serves as a switching circuit to connect the output of the phase detector 18 to a filter 32' which has a long time constant with respect to the duty cycle of the pulse wave coincidence circuit 30'.

The output of the filter 32' is applied to a servo amplifier 34', and the output of the servo amplifier 34' is applied to the motor 24' which controls the position of the phase shifter 22'.

The pulse wave coincidence circuit 30' is actuated for brief intervals of time during the leading edges of each of the slave pulses Y by means of pulses H which are produced at a time $\beta$ after each of the pulses D by means of a delay circuit 36', to which the pulses D are applied, and a gate generator 38' which is responsive to the output of the delay circuit 36'.

The signals produced by the phase detector 18, which vary in accordance with the phase relationship between the slave pulses Y and the reference signal produced at the output of the phase shifter 22', are connected through the pulse wave coincidence circuit 30' to the filter 32' for a brief interval of time during the leading edges of each of the slave pulses Y and serve to control the servo system so that the radio frequency reference signal produced by the phase shifter 22' is maintained in fixed phase relationship with respect to the radio frequency cycles of the slave pulses Y. Ordinarily the respective reference signals are maintained in phase quadrature with respect to the master and slave radio frequency signals.

Thus, the control signals which represent the respective phase relationships between the reference signals and the radio frequency cycles of the master and slave loran pulses are derived from a common phase detector. In this manner, the accuracy of the phase measurements is increased since any changes in the characteristics of the phase detector have no effect upon the phase relationship between the two reference signals which is shown on the indicator 40.

Fig. 2 shows a modification of the apparatus shown in Fig. 1, wherein the two reference signals are produced manually rather than by the two servo systems shown in Fig. 1.

In the embodiment of the invention shown in Fig. 2, the first reference signal is produced by a radio frequency oscillator 42 which is provided with means for manually controlling the phase of the radio frequency signal produced thereby. The second reference signal is produced by a manually adjustable phase shifter 44.

As before, the two reference signals are applied through gates 26 and 26' to a common phase detector 18 where they are compared with the signals A which comprise the master and slave pulses X and Y produced by the loran transmitters.

An oscilloscope 46 is connected to the output of the phase detector 18 and the pulses C, which are produced by the pulse time comparator and trigger pulse generator 14, are applied to the synchronizing circuit of the oscilloscope 46 so as to actuate the sweep circuit of the oscilloscope 46 in synchronism with each pair of master and slave signals.

Thus, an operator can observe the magnitude of the error signals produced by the phase detector 18, and can adjust the oscillator 42 and the phase shifter 44 so as to maintain the desired phase relationships between the two reference signals and the master and slave pulses. The difference in phase of the two reference signals is indicated by the control knob on the phase shifter 44.

If the signals A are affected by sky-wave interference, the operator should compare the magnitudes of only the leading edges of the error signals produced by the phase detector 18.

Fig. 3 shows a modification of the apparatus shown in Fig. 1, wherein the error signals which represent the relative phase between the respective reference signals and the master and slave pulses are produced in a different manner.

Referring now to Figs. 3 and 5, the signals A through D are produced in the same manner as discussed above with reference to Fig. 1.

However, in this embodiment of the invention, a phase detector 48 is employed which serves to sample the instantaneous magnitude of a small portion of one or a few cycles of each of the pulse signals A each time it is activated by means of pulse signals which are applied to the input circuit which serves as the control circuit thereof. The phase detector 48 may be a pulse wave coincidence circuit such as the four diode type shown on page 12 of the Proceedings of the Institute of Radio Engineers, for January 1943, for example.

The two reference signals are derived from an oscillator 20 and the two phase shifters 22 and 22', as before.

However, the reference signals are converted into pulse signals by means of a pair of pulse generators 50 and 50', each of which serves to produce a unidirectional pulse at the instant when each cycle of the reference signal which is applied thereto changes from negative to positive. The duration of each of the pulses which are produced by the pulse generators 50 and 50' is equal to or slightly less than one-half of the period of the radio frequency signal produced by the oscillator 20.

The output of the pulse generator 50 is applied through a gate 52 to the control circuit of the phase detector 48. The gate 52 is actuated by means of the pulses J which are produced by a gate generator 54 in response to the pulses C which are applied to the gate generator 54 through a delay circuit 56.

The delay circuit 56 serves to introduce a time delay $\beta$ so that the pulses J are caused to occur at a predetermined time during the leading edges of each of the master pulses X. The pulses J have a duration sufficient to cause the gate 52 to pass one or a few of the pulses which are produced by the pulse generator 50.

Since the signals A are applied to the input circuit of the phase detector 48, the pulse signals which are applied through the gate 52 to the control circuit of the phase detector 48 serve to cause the phase detector 48 to produce output signals having magnitudes which vary in accordance with the difference in phase between the reference signals produced by the phase shifter 22 and the master pulses X.

The pulses C are also applied to a square wave generator 57 which serves to produce a pulse L in response to each of the pulses C. The pulses L have a duration greater than the time intervals during which the master pulses X may be received.

The pulses L are applied to the winding of a relay 58 and serve to cause the armature of the relay 58 to connect the output of the phase detector 48 to the filter 32 for the duration of each of the pulses L.

As explained above with reference to Fig. 1, the signals produced at the output of the filter 32 serve to control the servo system so that the radio frequency reference signal produced by the phase shifter 22 is maintained in fixed phase relationship with respect to the radio frequency cycles of the master pulses X.

The output of the pulse generator 50' is applied through a gate 52' to the control circuit of the phase detector 48. The gate 52' is actuated by means of the pulses K, which are produced by a gate generator 54' in response to the pulses D which are applied to the gate generator 54' through a delay circuit 56'.

The delay circuit 56' serves to introduce a time delay $\beta$ so that the pulses K are caused to occur at a predetermined time during the leading edges of each of the slave pulses Y. The pulses K have the same duration as the pulses J and serve to cause the gate 52' to pass one or a few of the pulses which are produced by the pulse generator 50'.

Thus, one or a few of the pulses which are produced by the pulse generator 50' are applied to the control circuit of the phase detector 48 during the times when each of the slave pulses Y occur, and the phase detector 48 produces output signals having magnitudes which vary in accordance with the difference in phase between the reference signal produced by the phase shifter 22' and the slave pulses Y.

Since the phase detector 48 is connected through the armature of the relay 58 to the filter 32' during the time intervals in which the slave pulses Y may be received, the signals which are applied to the filter 32' are the control signals which represent the difference in phase between the reference signal produced by the phase shifter 22' and the slave pulses Y. The signals produced at the output of the filter 32' serve to control the servo system so that the radio frequency reference signal produced by the phase shifter 22' is maintained in fixed phase relationship with respect to the radio frequency cycles of the slave pulses Y.

The phase relationship between the two reference signals, which is the same as the phase relationship between the master pulses X and the slave pulses Y, is measured by means of the indicator 40 which serves to indicate the amount of phase shift introduced by the phase shifter 22'.

It will be apparent that various modifications may be made in the various embodiments of the invention disclosed herein. For example, different servo control systems may be substituted for those shown in Figs. 1 and 3, various types of phase detectors may be employed, the phase relationship between the two reference signals may be measured by applying the two signals to a phase meter, and the embodiment of the invention shown in Fig. 3 may be modified so as to correspond to the apparatus shown in Fig. 2.

Since many changes could be made in the apparatus described above and many apparently widely different embodiments of this invention could be made without departing from the scope thereof, it is intended that all the matter contained in the above description or shown in the accompanying drawings shall be interpreted as illustrative and not in a limiting sense.

I claim:

1. In a system for receiving recurrent pairs of radio frequency pulse signals, a radio frequency amplifier for amplifying said pulse signals, a pulse time comparator responsive to the output of said radio frequency amplifier for providing an indication of the time-delay between the pairs of pulse signals received, a phase detector having a pair of input circuits, one of said input circuits being connected to the output of said amplifier, first and second sources of radio frequency reference signals having control means connected to the output of said phase detector for adjusting the phase of said reference signals, a switching circuit having a control circuit connected to the output of said amplifier for connecting the other input circuit of said phase detector to said first and second sources of reference signals in a predetermined sequence in synchronism with said pairs of radio frequency pulse signals, and means for indicating the phase relationship between said first and second sources of reference signals.

2. In combination, a source of recurrent radio frequency pulse signals, phase detecting means having a pair of input circuits, one of said input circuits being connected to the output of said source of radio frequency pulse signals, a plurality of sources of reference signals and a switching circuit synchronized with said pulse signals for connecting the other input circuit of said phase detecting means to said sources of reference signals in a predetermined sequence.

3. In a system for receiving recurrent radio frequency pulse signals, a radio frequency amplifier for amplifying said pulse signals, a phase detector having a pair of input circuits, one of said input circuits being connected to the output of said amplifier, a plurality of sources of radio frequency reference signals, and a switching circuit having a control circuit connected to the output of said amplifier for connecting the other input circuit of said phase detector to said sources of radio frequency reference signals in a predetermined sequence in synchronism with said pulse signals.

4. In a system for receiving pairs of recurrent radio frequency pulse signals, a radio frequency amplifier for amplifying said pulse signals, a phase detector having a pair of input circuits, one of said input circuits being connected to the output of said amplifier, two sources of reference signals of adjustable phase and of substantially the same frequency as the radio frequency components of said pulse signals, a switching circuit having a control circuit connected to the output of said amplifier for connecting the other input circuit of said phase detector to one of said sources of reference signals during times when one of the pulses of said pairs of pulses occur and to the other of said sources of reference signals during the times when the other pulses of said pairs of pulse signals occur, and means for measuring the phase relationship between the signals produced by said two sources of reference signals.

5. In combination, a source of radio frequency pulse signals, a phase detector having a pair of input circuits, one of said input circuits being connected to the output of said source of pulse signals, oscillator means for producing a radio frequency signal of adjustable phase, phase-shifting means connected to the output of said oscillator means, and a switching circuit synchronized with said pulse signals for selectively connecting the outputs of said oscillator means and said phase-shifting means to the other input circuit of said phase detector during the times when predetermined pulses of said pulse signals occur.

6. The apparatus of claim 5 further including means for indicating the amount of phase shift produced by said phase-shifting means.

7. In combination, a source of radio frequency pulse signals recurring in a predetermined sequence, phase-detecting means having first and second input circuits, said first input circuit being connected to said source of pulse signals, adjustable means for producing a radio frequency signal, a first switching means synchronized with said pulse signals for connecting the output of said adjustable means to the second input circuit of said phase-detecting means during the times when predetermined pulses of said pulse signals occur, phase-shifting means connected to the output of said adjustable means, and a second switching means synchronized with said pulse signals for connecting the output of said phase-shifting means to the second input circuits of said phase-detecting means during the times when other predetermined pulses of said pulse signals occur.

8. The apparatus of claim 7 further including means connected to said phase-shifting means for indicating the amount of phase shift between the signals produced by said adjustable means and said phase-shifting means.

9. In combination, a source of radio frequency pulse signals, a phase detector having a pair of input circuits, one of said input circuits being connected to the output of said source of pulse signals, oscillator means for producing a radio frequency signal of adjustable phase with respect to the radio frequency components of said pulse signals, phase-shifting means connected to the output of said oscillator means, switching means connected to said source of pulse signals and synchronized with said pulse signals for selectively connecting the outputs of said oscillator means and said phase-shifting means to the other input circuit of said phase detector during the times when predetermined pulses of said pulse signals occur, first and second servo systems respectively connected to said oscillator means and said phase-shifting means for controlling the phase of the output signals thereof, and switching means connected to said source of pulse signals and synchronized with the signals produced thereby for connecting the output of said phase detector selectively to said first and second servo systems during the times when predetermined pulses of said pulse signals occur.

10. In combination, a source of radio frequency pulse signals having the same frequency and recurring in a predetermined sequence, phase-detecting means having first and second input circuits, said first input circuit being connected to said source of pulse signals, an oscillator for producing a reference radio frequency signal, a first switching means synchronized with said pulse signals for connecting the output of said oscillator to the second input circuit of said phase-detecting means during the times when predetermined pulses of said pulse signals occur, control means for causing said reference radio frequency signal to be in predetermined phase relation to the radio frequency components of said predetermined pulse signals, phase-shifting means connected to the output of said control means, a second switching means synchronized with said pulse signals for connecting the output of said phase-shifting means to the second input circuit of said phase-detecting means during the times when other predetermined pulses of said pulse signals occur, and control means for causing the signal produced at the output of said phase-shifting means to be in predetermined phase relation to the radio frequency components of said other predetermined pulse signals.

11. In combination, a source of radio frequency pulse signals recurring in a predetermined sequence, phase-detecting means having first and second input circuits, said first input circuit being connected to said source of pulse signals, an oscillator for producing a reference radio frequency signal of substantially the same frequency as the radio frequency components of said pulse signals, a first switching means synchronized with said pulse signals for connecting the output of said oscillator to the second input circuit of said phase-detecting means during the times when predetermined pulses of said pulse signals occcur, a first servo system for controlling the phase of the signal produced by said oscillator, means synchronized with said pulse signals for connecting the output of said phase-detecting means to said first servo system during the times when said predetermined pulses occur, phase-shifting means connected to the output of said oscillator, a second switching means synchronized with said pulse signals for connecting the output of said phase-shifting means to the second input circuit of said phase-detecting means during the times when other predetermined pulses of said pulse signals occur, a second servo system connected to said phase-shifting means for controlling the phase of the output signal of said phase-shifting means, and means synchronized with said pulse signals for connecting the output of said phase detecting means to said second servo system during the times when said other predetermined pulses occur.

12. In a system for receiving pairs of recurrent radio frequency pulse signals, a radio frequency amplifier for amplifying said pulse signals, a phase detector having a pair of input circuits and an output circuit, one of said input circuits being connected to the output of said amplifier, two sources of reference signals of adjustable phase and of substantially the same periodicity as the radio frequency components of said pulse signals, switching means having a control circuit connected to the output of said amplifier for connecting the other input circuit of said phase detector to one of said sources of reference signals during the times when one of the pulses of said pairs of pulses occur and to the other of said sources of reference signals during the times when the other pulses of said pairs of pulse signals occur, means connected to the output circuit of said phase detector for controlling the phase of the signals produced by said two sources of reference signals, and means for measuring the phase relationship between the signals produced by said two sources of reference signals.

13. The apparatus in claim 12, wherein each of said two sources of reference signals produces substantially sinusoidal radio frequency signals.

14. The apparatus in claim 12, wherein each of said two sources of reference signals produces unidirectional pulse signals, the duration of each pulse being approximately one-half of the period of the radio frequency cycles of said recurrent radio frequency signals.

15. In combination, a source of radio frequency pulse signals, a phase detector having a pair of input circuits, one of said input circuits being connected to the output of said source of pulse signals, oscillator means for producing a radio frequency signal of adjustable phase, phase-shifting means connected to the output of said oscillator means, a first pulse generator connected to the output of said oscillator means, a second pulse generator connected to the output of said phase-shifting means, each of said pulse generators serving to produce a unidirectional pulse in response to each cycle of the radio frequency signal applied thereto, and a switching circuit synchronized with said pulse signals for selectively connecting the outputs of said first and second pulse generators to the other input circuit of said phase detector during the times when predetermined pulses of said radio frequency pulse signals occur.

References Cited in the file of this patent

UNITED STATES PATENTS

| | | |
|---|---|---|
| 2,497,513 | Paine et al. | Feb. 14, 1950 |
| 2,578,980 | O'Brien | Dec. 18, 1951 |